Figure 1:
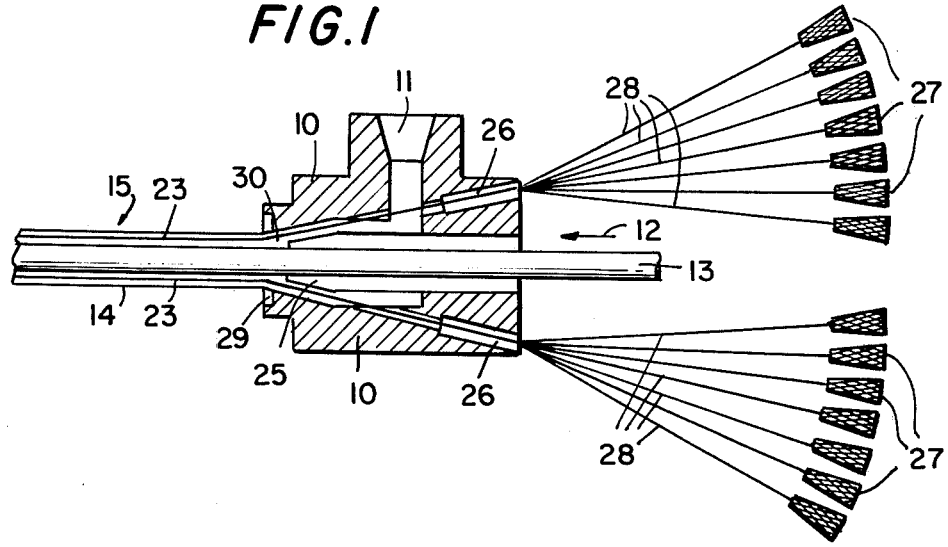

United States Patent [19]

Ney

[11] 4,151,237
[45] Apr. 24, 1979

[54] PRODUCTION OF CABLES WITH UNDULATED TENSION RELIEF ELEMENTS

[75] Inventor: Robert Ney, Langerwehe, Fed. Rep. of Germany

[73] Assignee: Lynenwerk GmbH & Co. KG, Fed. Rep. of Germany

[21] Appl. No.: 867,238

[22] Filed: Jan. 6, 1978

[30] Foreign Application Priority Data

Jan. 20, 1977 [DE] Fed. Rep. of Germany ....... 2702185

[51] Int. Cl.² .......................... B29F 3/10; H01B 7/18
[52] U.S. Cl. ................................. 264/40.7; 174/113 R; 174/121 SR; 174/122 G; 174/124 GC; 264/174
[58] Field of Search ...................... 264/167, 342, 40.7, 264/174, 40.7; 174/113 R, 121 SR, 122 G, 124 GC

[56] References Cited

U.S. PATENT DOCUMENTS

| 2,374,744 | 5/1945 | Gregory | 264/167 |
| 3,249,666 | 5/1966 | French | 264/103 |
| 3,388,545 | 6/1968 | Cannon et al. | 264/103 |
| 3,575,834 | 4/1971 | Hoole et al. | 264/342 |
| 3,879,518 | 4/1975 | Ney et al. | 174/113 R |
| 3,928,519 | 12/1975 | Kashiyama et al. | 264/40.7 |
| 3,983,313 | 9/1976 | Ney et al. | 174/113 R |
| 3,987,612 | 10/1976 | Bobkowicz | 264/103 |

Primary Examiner—Jay H. Woo
Attorney, Agent, or Firm—Marn & Jangarathis

[57] ABSTRACT

In the production of electric cable in an extruder head having undulated tension relief elements embedded in the jacket, the jacketing material and tension relief elements are introduced at a velocity greater than the cable core, with such velocity being subsequently decreased to provide a compressive force which forms the undulations.

6 Claims, 2 Drawing Figures

PRODUCTION OF CABLES WITH UNDULATED TENSION RELIEF ELEMENTS

This invention relates to electric cables, and more particularly to electric cables having undulated tension relief elements embedded in the cable jacket.

U.S. Pat. Nos. 3,879,518 and 3,983,313 disclose electric cables having undulated tension relief elements embedded in the cable jacket. In accordance with such patents, the cable jacket is formed of polyethylene and the undulation of the tension relief elements results from the shrinkage of polyethylene during cooling thereof.

In some cases, it is highly desirable to provide cables with undulated tension relief elements in which the cable jacket is formed from a material other than polyethylene. For example, polyethylene is flammable and in cases where non-flammability is desired the cable jacket should be formed from a non-flammable material, such as, polyvinyl chloride; however, polyvinyl chloride does not have the shrinkage properties of polyethylene. As a result, undulation of the tension relief element can not be effected by cooling of the cable jacket.

In accordance with the present invention there is provided a process for providing a jacketed cable core having undulated tension relief elements therein by introducing a cable core, a jacketing material and tension relief elements into an extruder head to produce a tubular jacket for the core having the tension relief elements embedded in the jacketing material, with the radial undulations of the tension relief elements being provided by introducing the tension relief elements and the jacketing material at a velocity greater than the velocity of the cable core and thereafter reducing the velocity of the jacketing material having the tension relief elements therein to produce the undulations in the tension relief elements.

In this manner, the cable jacket can be produced from materials other than polyethylene in that the shrinkage properties of the polyethylene are no longer required for providing undulations in the tension relief elements.

More particularly, the relative velocities between the cable core and the jacketing material are controlled in a manner to generate an axial compressive force in the cable jacket and tension relief elements to provide the undulations. The greater the difference in the relative speeds, the greater undulations and by proper coordination the desired undulation can be achieved. Accordingly, the abrupt axial compression which occurs at the extruder head outlet or beyond the discharge therefrom produces the undulation, whereby undulation of the tension relief elements can be obtained independently of the properties; i.e., shrinkage property, of the jacketing material.

Thus, in accordance with the present invention, there is a retarding effect on the jacketing material including the tension relief strands and such retarding effect is provided by the velocity difference between the jacketing material and cable core. In the case of a highly compressible and viscous jacketing material such compressive force is exerted immediately beyond the mouthpiece of the extruder head and there is a swelling of the jacketing material; i.e., the outer diameter of the jacket is greater than the inner diameter of the mouthpiece.

It is also possible to obtain such a retarding effect with a material of low viscosity and compressibility within the mouthpiece of the extruder head by providing a mouthpiece having an increasing inner diameter in the direction of flow, whereby the velocity of the jacketing material decreases as it passes through each larger area. In such a case, the tension relief elements would be fed at a rate corresponding to the velocity of the jacketing material in the smaller diameter area of the mouthpiece in order to provide the desired undulation.

Figure 2:
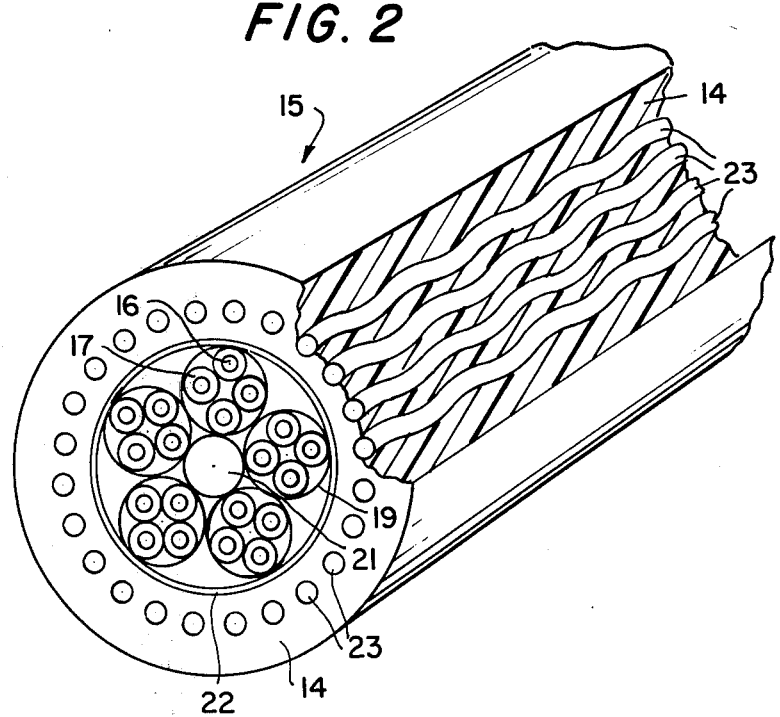

The invention will be further described with respect to the accompanying drawings, wherein:

FIG. 1 is a schematic axial longitudinal sectional view through the extruder head of a cable extruding machine with a cable being made therein; and, FIG. 2 is a schematic plan view of a cable segment with partly exposed tension relief elements.

It is to be understood that the general principles for forming the jacketed cable in accordance with the present invention are in accordance with those set forth in the aforementioned U.S. Pat. Nos. 3,879,518 and 3,983,313, with the present invention differing from such patents by the fact that the jacket may be produced from materials other than polyethylene and that the undulations are formed by controlling the parameters within the extruder head, as described, instead of depending on the shrinkage characteristics of the jacketing material. As a result, the teachings of the aforementioned U.S. patents are hereby incorporated by reference.

Referring to the drawings, a cable extruder head 10 is provided with an opening 11 for coupling the screw of the extruder (not shown). A premade cable core 13 made of insulated electric conductors moves in the direction of arrow 12 into head 10 wherein the outer jacket 14 is applied thereon, to provide finished cable 15, which is cooled off in the commonly known manner.

As particularly shown in FIG. 2, the finished cable 15 has a cable core comprised of conductors 16, insulation 17; i.e., five sets of two twisted conducter pairs 19, and a core 21 made of plastic material. Around the conductor pairs 19 is a commonly used wrapping 22 made of plastic bands.

The outer jacket 14 is extruded over wrapping 22 which moves with the cable core 13 into the extruder head wherein an alternating amount of tension relief elements 23 are provided. These elements may be constructed from groups of yarns or twines having different thread dimensions whereby the number of groups on the one hand and the number of yarns or twines for each group on the other hand depend on the number of conductor pairs 19, the required minimum breaking stress of the cable and the thread size. Such members also depend on the distance of the groups from each other and the distance of the groups to the inner jacket circumference. These tolerances are disclosed in the aforementioned U.S. patents. It is essential that the tension relief elements 23 do not run through jacket 14 absolutely parallel to the cable axis (core 21); i.e., the tension relief elements should be undulated, as shown in FIG. 2. This provides an intimate positive locking between the tension relief elements and the jacket material.

Cable core 13 moves through a nozzle 25 in extruder head 10 and discharges into a hollow chamber 30 into which the front ends of channels 26 discharge, with channels 26 being concentrically arranged with respect to the fed cable core 13 and of which only two channels are shown in FIG. 1. The channels 26 are provided with tension relief elements 28 from a supply station, preferably in the form of suspended rollers 27 which carry the yarns or twines 28.

The front end of extruder head 10 has an outer matrix or mouthpiece 29 through which the finished cable 15 is withdrawn. The tension relief elements 28 are imbedded in the jacketing material (thermoplastic or elastomeric) introduced through screw coupling 11, and the funnel-shaped hollow chamber 30 receives the jacketing material with the embedded tension relief elements 28.

The speed or velocity of the jacketing material is dependent upon the exerted pressure and the inner diameter of the mouthpiece 29 and the speed or velocity of the cable 13 is equal to the drawing-off speed of the finished cable 15. The relative speed or velocity between the cable core and jacketing material is controlled in a manner such that the jacketing material moves through the head 10 at a velocity greater than the cable core.

The tension relief elements 23 also move at a velocity greater than the velocity of the cable core and such velocity generally corresponds to the flow speed of the jacketing material. As a result, the length of the tension relief elements 23 is longer than the length of cable core 13 or finished cable 15, with the additional length being taken up in the undulation of the tension relief elements 23.

should be apparent, proper undulation improves flexibility as a result of the bellows effect which permits bending.

As should be apparent from the above description, as a result of the velocity difference between the jacketing material and cable core, the slower moving cable core has a retarding effect on the faster moving tension relief elements at the time of forming the jacket on the core, whereby the tension relief elements are undulated.

The invention will be further described with respect to the following example; however, the scope of the invention is not to be limited thereby:

EXAMPLE

In the following tests, the dimensions of the extruder head, pressure and charging rate of the jacketing material is maintained constant for the several tests with respect to each jacketing material. The drawing off speed of the cable is changed to thereby change the velocity difference between the jacketing material and cable core. As the velocity of the jacketing material increases with respect to the cable core, the diameter of the finished cable increases with respect to the mouthpiece inner diameter and the degree of undulation increases.

| Test No. | Material | Inner Nozzle Diameter (mm) | Mouthpiece Inner Diameter (mm) | Screw Rotation min$^{-1}$ | Charging Rate of Material (A) | Material Pressure (kp/cm$^2$) | Drawing Off Speed of Cable (m/min) | Outer Diameter of Cooled Cable (mm) | Degree of Undulation |
|---|---|---|---|---|---|---|---|---|---|
| 1 | PVC | 7.7 | 12.1 | 20 | 65 | 25 | 12 | 12.9 | medium |
| 2 | PVC | 7.7 | 12.1 | 20 | 65 | 25 | 20 | 11.9 | small |
| 3 | PVC | 7.7 | 12.1 | 20 | 65 | 25 | 22 | 11.6 | small |
| 4 | PVC | 7.7 | 12.1 | 20 | 65 | 25 | 10 | 14.5 | high |
| 5 | PVC | 7.7 | 12.1 | 20 | 65 | 25 | 10 | 14.5 | high |
| 6 | PE | 7.7 | 12.1 | 20 | 78 | 25 | 12 | 13.6 | high |
| 7 | PE | 7.7 | 12.1 | 20 | 78 | 25 | 20 | 12.5 | medium |
| 8 | PE | 7.7 | 12.1 | 20 | 78 | 25 | 22 | 11.9 | small |
| 9 | PE | 7.7 | 12.1 | 0 | 78 | 25 | 26 | 11.4 | none |
| 10 | PE | 7.7 | 12.1 | 20 | 78 | 25 | 32 | 11.3 | none |

PVC = polyvinyl chloride
PE = polyethylene

As a result, the dimensions of the undulations can be controlled by controlling the relative velocities of the jacketing material and tension relief elements with respect to the cable core. Such velocities can be controlled by controlling and/or adjusting the velocity of the cable core (draw-off speed of finished cable), mouthpiece diameter, pressure on jacketing material, etc.

A convenient manner of determining that there is a difference in relative velocities is by measuring the outer diameter of the cable after its discharge from the mouthpiece with respect to the mouthpiece inner diameter. In accordance with the invention, the outer diameter of the cable should be greater than the inner diameter of the mouthpiece with the difference in diameter increasing as the relative speed of the jacketing material and tension relief elements increases with respect to the cable core. It has been found that the degree of undulation increases as the velocity difference increases (and the diameter difference between the finished cable and mouthpiece inner diameter increases) and such difference should be coordinated to provide the required undulation without the tension relief elements overtaking themselves and forming S-like loops. At the extreme, this could result in retarding the feed movement of the tension relief elements which would result in too great a tension which would reduce cable flexibility. As The present invention is particularly advantageous in that it is possible to provide a jacketed cable having undulated tension relief elements without limiting the choice of jacketing material to only those that have certain shrinkage characteristics. Thus, for example, if flammability is a concern; e.g., for cables used in mines, a jacket material of low flammability such as polyvinyl chloride can be used. Any one of a wide variety of cables can be produced in accordance with the invention and the desirable properties imparted by undulated tension relief elements, and in particular undulated glass fibers, are not limited to self supporting air cables. For example, such properties would also have applicability in cables which have to be drawn in lengths into pipes or shafts or which have to be placed into the ground.

Numerous modifications and variations of the present invention are possible in light of the above teachings and, therefore, within the scope of the appended claims the invention may be practiced otherwise than as particularly described.

I claim:

1. In the production of electric cable in a cable extruder head wherein a cable core, a jacketing material and tension relief strands are fed into the extruder head to produce a tubular jacket for the core having the tension relief strands embedded in the jacket material, an improved method for providing undulations in said tension relief strands, comprising:

forming said undulations by introducing the tension relief strands and the jacketing material into the extruder head at a velocity greater than the velocity of the cable core and thereafter reducing the velocity of the jacketing material having the tension relief strands therein to effect compression and produce said undulations.

2. The method of claim 1 wherein the jacketed cable is withdrawn from the extruder head and has a diameter greater than the diameter of the outlet of the head.

3. The method of claim 2 wherein the tension relief strands are glass fibers.

4. The method of claim 3 wherein the jacketing material is polyvinyl chloride.

5. The method of claim 1 wherein the relative velocities of the tension relief strands and jacketing material with respect to the cable core is controlled to control the degree of undulation.

6. The method of claim 1 wherein the tension relief strands embedded in the jacket are in an untwisted form.

* * * * *